C. W. HAZELETT.
STORAGE BATTERY CONNECTION.
APPLICATION FILED NOV. 21, 1917.
1,316,034.
Patented Sept. 16, 1919.
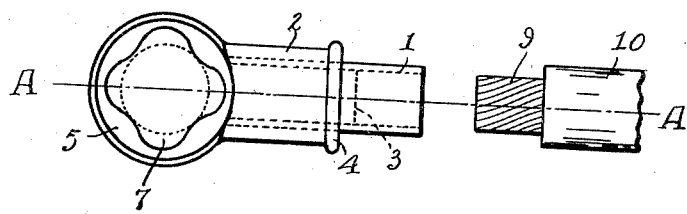
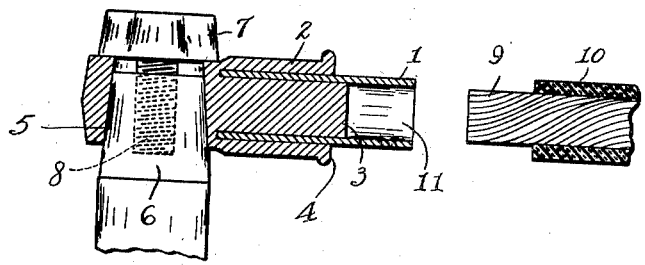
INVENTOR.
C. W. HAZELETT
BY Ira J. Adams
ATTORNEY

UNITED STATES PATENT OFFICE.

CLARENCE W. HAZELETT, OF LAKEWOOD, OHIO, ASSIGNOR TO NATIONAL CARBON COMPANY, INC., A CORPORATION OF NEW YORK.

STORAGE-BATTERY CONNECTION.

1,316,034.  Specification of Letters Patent.  Patented Sept. 16, 1919.

Application filed November 21, 1917. Serial No. 203,150.

*To all whom it may concern:*

Be it known that I, CLARENCE W. HAZELETT, a citizen of the United States, residing at Lakewood, in the county of Cuyahoga and State of Ohio, have invented a certain new and useful Improvement in Storage-Battery Connections, of which the following is a full, clear, and exact description.

This invention relates to terminal connections for storage batteries.

A very satisfactory and relatively inexpensive form of connector for storage batteries consists of a lead shank cast directly onto the end of a flexible cable, with a portion having an eye adapted to fit the plate connector post of the battery. Such an arrangement, however, can be used only when the manufacturer furnishes the complete connection. Frequently the manufacturer is called upon to furnish only the lead body of a connection, so that the service station or customer may attach the cable. It is impracticable to solder or "burn" a cable into a cavity of the particular connection referred to, as the lead shank will melt and be destroyed before the cable can be fused into position. It is the object of this invention to improve this form of connection so that anyone can attach the cable directly thereto without there being any danger of melting down the lead shank. The advantages of the improvement will be understood from the appended description with reference to the drawings in which:

Figure 1 is a top view of the improved connection.

Fig. 2 is a section taken on the line A—A of Fig. 1.

In my improved battery connection a copper tube 1, preferably tinned or lead coated within and without, is cast directly into the leaden lug or body portion 2 in such a way that the lead extends into the inner bore of the tube as shown at 3. Preferably the mold is arranged in such a way that the lead is cast into the bore of the tube beyond the end 4 of the lead shank, although this is not absolutely essential.

The lead body portion 2 has a tapered eye or opening 5 adapted to fit the tapered terminal post 6 of the storage battery, and is held in place by a nut 7 threaded onto a copper or brass insert 8 cast into the post as shown. In practice both the nut 7 and the insert 8 are lead coated or tinned to prevent corrosion by the electrolyte.

With a connection made in this way the bare end 9 of a stranded conductor 10 can be soldered or sweated directly into the chamber 11 of the copper tube 1 without there being any likelihood of melting down the leaden shank of the body portion 2.

While the tube 1 is preferably formed of copper, other metals can be used if they have a higher fusion point than lead, such as brass or iron. These are therefore to be regarded as equivalents of copper.

Having described my invention, what I claim is:—

1. In storage battery connectors, a lead terminal having an eye adapted to receive a terminal post, a tube having a higher fusion point than lead embedded in said terminal, the lead of said terminal also extending into and filling the bore of the embedded portion of the tube.

2. In storage battery connectors, a lead terminal having an eye adapted to receive a terminal post, a copper tube having a portion thereof embedded in said lead terminal, the lead of said terminal also extending into the embedded portion of the tube, said tube having an inner and outer coating of metal adapted to fuse with the lead terminal.

3. In storage battery connectors, a lead terminal having an eye adapted to receive a terminal post, a tube having a higher fusion point than lead embedded in said terminal, said tube having an inner and outer coating of metal adapted to fuse with the lead terminal, and the lead of said terminal filling the bore of the embedded portion of said tube and extending beyond the outer sheath of lead.

In testimony whereof, I hereunto affix my signature.

CLARENCE W. HAZELETT.